United States Patent
Mihaila (10) Patent No.: US 9,942,612 B2
(45) Date of Patent: Apr. 10, 2018

(54) TELEVISION RECEIVER, TELEVISION SET, AND METHOD FOR UPDATING PROGRAM SCHEDULE INFORMATION IN A TELEVISION RECEIVER

(71) Applicant: Andrei Mihaila, Bucharest (RO)

(72) Inventor: Andrei Mihaila, Bucharest (RO)

(73) Assignee: NXP USA, Inc., Austin, TX (US)

( * ) Notice: Subject to any disclaimer, the term of this patent is extended or adjusted under 35 U.S.C. 154(b) by 197 days.

(21) Appl. No.: 14/528,502

(22) Filed: Oct. 30, 2014

(65) Prior Publication Data

US 2016/0066052 A1 Mar. 3, 2016

(30) Foreign Application Priority Data

Aug. 29, 2014 (RO) .................... 2014 00662

(51) Int. Cl.
*H04N 21/482* (2011.01)
*H04N 21/458* (2011.01)
*H04N 21/462* (2011.01)

(52) U.S. Cl.
CPC ....... *H04N 21/482* (2013.01); *H04N 21/4583* (2013.01); *H04N 21/4622* (2013.01)

(58) Field of Classification Search
CPC .......... H04N 1/00328; H04N 1/00336; H04N 21/482; H04N 21/4583; H04N 21/4622; G06K 9/00
See application file for complete search history.

(56) References Cited

U.S. PATENT DOCUMENTS

| 5,635,978 A | 6/1997 | Alten et al. |
| 7,577,978 B1 | 8/2009 | Wistendahl et al. |
| 8,132,204 B2 * | 3/2012 | Haberman ........ G06F 17/30817 725/138 |

(Continued)

FOREIGN PATENT DOCUMENTS

WO 96/34491 A1 10/1996

OTHER PUBLICATIONS

Informitv, "Press green button to set reminder from a trailer on Sky," Feb. 26, 2006; downloaded from <<http://informitv.com/2006/02/26/press-green-button-to-set-reminder-from-a-trailer-on-sky>>, 2 pages.

(Continued)

*Primary Examiner* — Rong Le (57) ABSTRACT

A television receiver, comprising a television signal input, a tuner, a frame buffer, a control input, a pattern recognition unit, and an electronic program guide unit. In operation, the television signal input receives a television signal. The tuner generates consecutive frames of a selected television channel on the basis of the television signal and is connected to a screen so as to drive the screen to display the frames consecutively. The frame buffer buffers the frames. The control input receives a scheduling request triggered by a user. The pattern recognition unit determines one or more program schedule values in response to the scheduling request, by performing an automatic pattern recognition analysis of one or more frames residing in the frame buffer. The electronic program guide unit provides program schedule information and updates the program schedule.

19 Claims, 4 Drawing Sheets

(56) References Cited

U.S. PATENT DOCUMENTS

| | | | | |
|---|---|---|---|---|
| 8,281,340 | B2* | 10/2012 | Sumiyoshi | H04N 5/44543 709/219 |
| 2008/0098426 | A1* | 4/2008 | Candelore | H04N 5/4403 725/38 |
| 2008/0184313 | A1* | 7/2008 | Knudson | H04N 5/44543 725/58 |
| 2010/0070917 | A1* | 3/2010 | Gates | G06F 17/30053 715/810 |
| 2010/0269140 | A1 | 10/2010 | Shin et al. | |
| 2013/0133000 | A1* | 5/2013 | Kelley | H04N 21/482 725/37 |

OTHER PUBLICATIONS

Comcast, "Ready Remind and Ready Record on iTV," downloaded from <<http://xfinity.comcast.net/newguide/iTV%20Guide%20Ready%20Remind%20Record.pdf>> on Jul. 29, 2014, 1 page.

Service2media, "Television and device control solutions," TV Control and Engagement Apps; downloaded from <<http://www.service2media.com/media-suite/media-apps/tv-control-apps>> on Jun. 12, 2014, 2 pages.

Sky, "Make the most of Sky+" downloaded from <<http://www.sky.com/products/ways-to-watch/sky-plus/set-up-sky-plus>> on Jul. 29, 2014, 3 pages.

iDTV; "Point & Win: World's Fastest Video Recognition of TV Shows and Commercials" product features downloaded from <<http://idtv.me/>> on Jul. 29, 2014, 3 pages.

Google, "Google TV," product features downloaded from <<http://www.google.com/tv/>> on Jul. 29, 2014, 2 pages.

LG, "47G2: 47" Class Cinema 3D LED Google TV" product details, downloaded from <<http://www.lg.com/us/tvs/lg-47G2-led-tv>> on Jul. 29, 2014, 1 page.

Entertailion LLC, "Able Remote Mobile App," product features downloaded from <<http://ableremote.com/>> on Jul. 29, 2014, 2 pages.

Samsung; "Samsung Smart TV 2013 with Smart Interaction," downloaded from <<http://www.samsung.com/us/2013-smart-tv/>> on Jul. 29, 2014, 41 pages.

* cited by examiner

TELEVISION RECEIVER, TELEVISION SET, AND METHOD FOR UPDATING PROGRAM SCHEDULE INFORMATION IN A TELEVISION RECEIVER

CROSS REFERENCE TO RELATED APPLICATION(S)

The present application claims priority to Romanian Patent Application No. RO A 2014 00662, entitled "TELEVISION RECEIVER, TELEVISION SET, AND METHOD FOR UPDATING PROGRAM SCHEDULE INFORMATION IN A TELEVISION RECEIVER," filed on Aug. 29, 2014, the entirety of which is herein incorporated by reference.

FIELD OF THE INVENTION

This invention relates to a television receiver, a television set, and a method for updating program schedule information in a television receiver.

BACKGROUND OF THE INVENTION

A television (TV) set is a device for receiving a television signal and for generating a television picture on a screen or monitor in accordance with the television signal. A television signal may comprise one or more channels. A television set can be configured by a user to select a certain channel among the channels contained in the television signal. The television set may be arranged to display the television picture of the selected channel. The television picture may be updated repeatedly, giving a viewer the impression of a moving picture. More specifically, each channel may provide a sequence or stream of frames. Each frame is a picture to be displayed on the screen for a brief period. The number of frames per second of a given channel is known as the frame rate of the channel. The frame rate may, for example, be between 15 and 30 frames per second. Each channel may contain audio content in addition to the video content represented by the frames. A television channel can thus be used to convey combined video and audio content to one or more spectators. A spectator is a person located near the television set and capable of watching and listening to the selected channel using the television set. A spectator may be referred to herein as a user. A channel may convey television content, that is, video content and possibly audio content, which may comprise various programs such as news programs, films, and transmissions of sporting events.

A television station, i.e., a television broadcaster, often plans and transmits programs on a certain channel in accordance with a time schedule. Such a schedule may be referred to as a program schedule or a broadcast schedule. A collection of program schedules of several channels may also be referred to collectively as a program schedule. A program schedule may be equivalent to or provided in the form of a list which comprises one or more and possibly very many program entries. Each program entry may comprise, for example, a name, number, or other identifier of a channel, a start time, and a description of a program scheduled to start at the start time. The description may comprise, for example, a name or title of the program or any other kind of textual or graphical information about the program. Program schedules may be communicated to television spectators to help them decide which programs they want to watch. For example, program schedules may be published in newspapers, magazines, and on the World Wide Web. Furthermore, program schedules may be included in the television signal delivered to the television set. The television set may have a user interface, e.g., a remote control, for enabling the user to display a current program schedule, or portions thereof, on the screen.

Some television sets are equipped with an electronic program guide (EPG) unit. An EPG unit may be designed to provide a user with program schedule information. The program schedule information provided by the EPG unit may be configurable by the user. The user may thus be enabled, for example, to schedule upcoming programs that he/she wants to watch or which should be recorded automatically by the television set. For instance, the television set may be configured to tune automatically to a channel at a certain time in accordance with the program schedule information provided by the electronic program guide unit. For example, the television set may thus tune to channel number 1 at 9 p.m. on a certain day assuming that the program schedule information comprises an entry indicating channel 1, 9 p.m., and the respective date. An electronic program guide unit may also be designed to enable the user to display program schedules, or parts thereof, e.g., in accordance with configurable filters or sorting criteria. The program schedule information provided by an electronic program guide unit may be updated, e.g., automatically on the basis of program schedule information encoded in the television signal, for example.

In addition, broadcasters often include program announcements in their television broadcasts to announce programs scheduled to be broadcast in the near future, e.g., within the next 14 days or so. Such announcements are also known as TV promotions. They often include a title of the upcoming program as well as a date and a time of day. This information, e.g., the title, the date, and the time of day, is usually displayed on the screen for a few seconds. A user who wants to remember this information may note it down using paper and pen, or program it into the electronic program guide unit, assuming that the EPG unit allows the user to do so. Both methods can, however, be cumbersome. Notably, when a television station announces a program, it can be difficult for the user to open a menu of the EPG unit and to navigate to a time slot corresponding to the announced program.

Interactive television (ITV) technology enables a television provider, e.g., a cable company, a satellite provider, or a television broadcast station, to complement TV promotions with additional information delivered via a separate data channel in the television signal. The television set may thus reserve announced programs automatically in the EPG unit. This, however, requires the television set to know the protocol of the ITV provider. Today, ITV is still an expensive solution, some of its features are provider-specific, and it fails if the program announcement is not transmitted via the separate data channel.

SUMMARY OF THE INVENTION

The present invention provides a television receiver, a television set, a method and a computer readable storage medium as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale.

DETAILED DESCRIPTION OF THE PREFERRED EMBODIMENTS

The figures schematically illustrate an example of a television set 10 including a television receiver 12. The figures also illustrate an example of a method for updating program schedule information in the television receiver 12.

Figure 1:
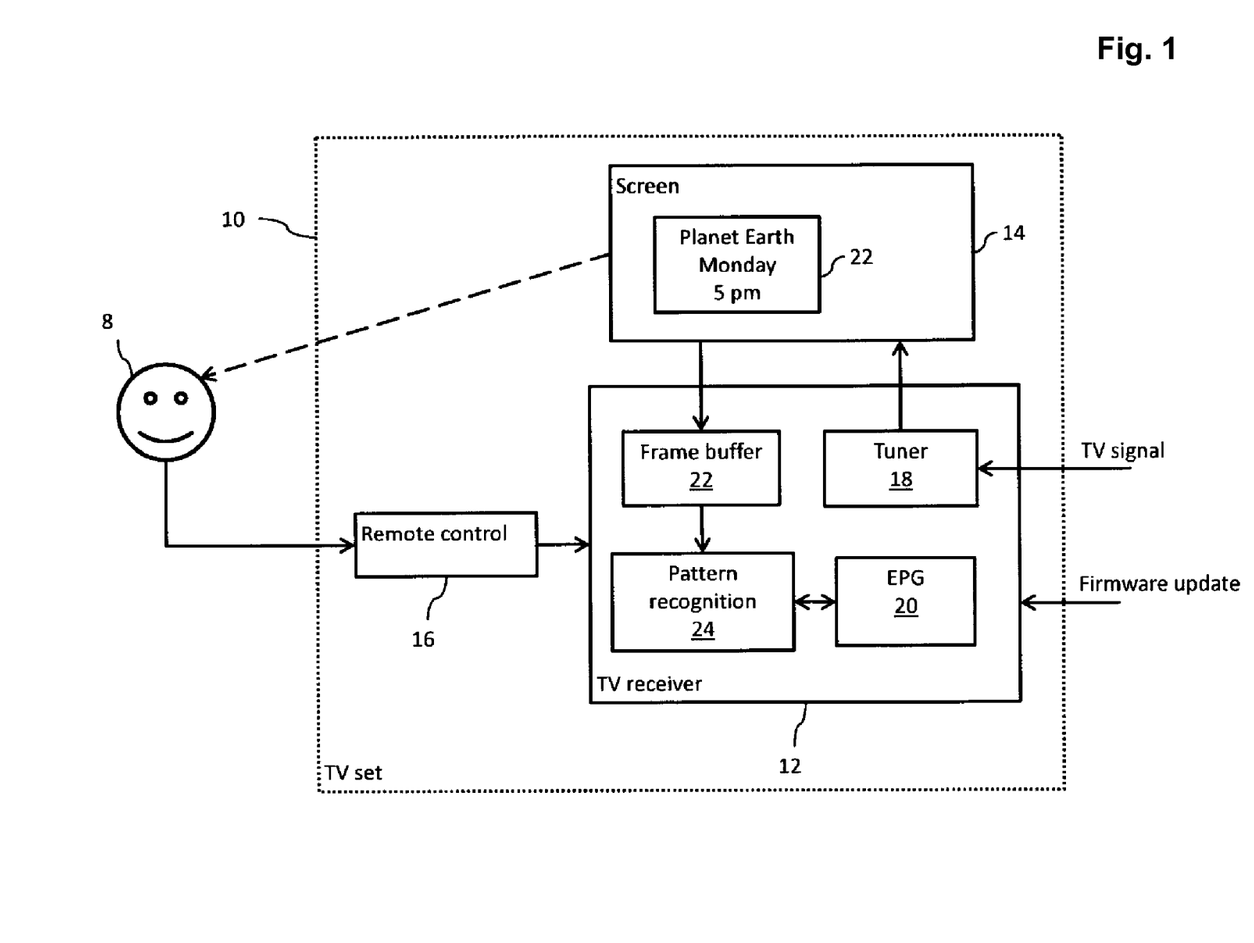
FIG. 1 schematically shows an example of an embodiment of a TV set.
Figure 2:
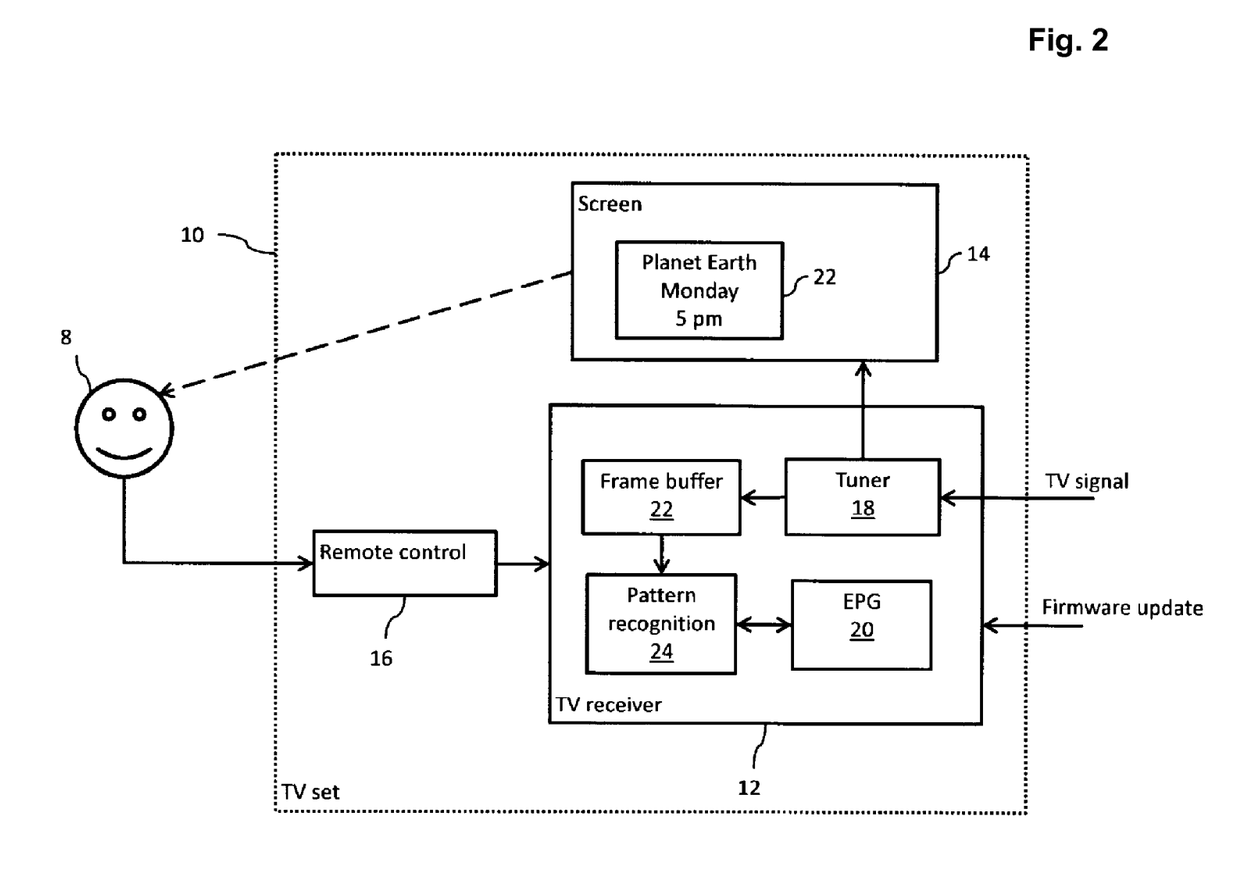
FIG. 2 schematically shows another example of an embodiment of a TV set.

The television receiver 12 may comprise a television signal input, a tuner 18, a frame buffer 22, a control input, a pattern recognition unit 24, and an electronic program guide unit 20. The television signal input may be arranged to receive a television signal; e.g., from an antenna or from a cable. The tuner 18 may be arranged to generate consecutive frames of a selected television channel on the basis of the television signal. The tuner 18 may be connected or connectable to a screen 14 so as to drive the screen to display the frames consecutively.

The frame buffer 22 may be arranged to buffer the frames. The control input may be arranged to receive a scheduling request triggered by a user 8. When the user 8 has triggered the scheduling request sufficiently soon, that is, within a certain time window, after noticing a TV promotion on the selected television channel, the frames residing in the frame buffer may contain graphical information of the TV promotion, e.g., about an upcoming program. This graphical information may be further analyzed automatically by the television receiver 12. For example, the pattern recognition unit 24 may be arranged to determine one or more program schedule values in response to the scheduling request, by performing an automatic pattern recognition analysis of one or more frames residing in the frame buffer. The electronic program guide unit 20 may be arranged for provide program schedule information, and to update the program schedule information on the basis of the program schedule values. The user 8, when watching a television program on the selected television channel, may thus update the program schedule information of the EPG unit 20 in a convenient manner, by triggering the scheduling request when he/she notices a program announcement on the selected television channel. More specifically, the user 8 may prompt the receiver 12 to analyze one or more recent frames provided by the frame buffer 22 and to extract the one or more program schedule values from these frames, e.g., to extract a program title, or a date, or a time of the program that is announced. In a simple implementation, the frame buffer 22 may have a capacity of only one frame. In a more sophisticated implementation, the frame buffer 22 may have a capacity of two or more frames, to enable the pattern recognition unit 24 to determine the program schedule values in a more reliable manner. The one or more program schedule values may include, for example, one or more of the following: a program title value representative of a program title, a date value representative of a date, a time value representative of a time, and channel value representative of a television channel.

Television broadcasters usually announce programs of a certain channel on the same channel. In contrast, a cross-channel announcement may be broadcast on one channel, e.g., channel "A", to announce a program scheduled for another channel, e.g., channel "B". Cross-channel announcements are less common. Considering that a program announcement for a program on the same channel, i.e., a same-channel program announcement, does not necessarily identify the channel, the pattern recognition unit 24 may be arranged to set the channel value to the selected television channel if the pattern recognition analysis does not yield a channel value. In other words, when the pattern recognition analysis fails to extract a channel value from the one or more recent frames, the channel value may be assumed to be that of the selected television channel, i.e., of the television channel that is currently selected to drive the screen 14. Also, if the automatic pattern recognition analysis fails to determine a certain program schedule value, e.g., a program title value, the respective value may be set to a default value, e.g., "void" or "not available" or "undefined", indicating that the respective value has not been determined. This may occur, for example, when the user 8 triggers the scheduling request when the selected television channel does not provide a promotion, or when the promotion is announced in characters for which the pattern recognition unit 24 is not adapted, e.g., characters of a rare character set.

The program schedule information may comprise a list of upcoming programs. Updating of the program schedule information may in this case comprise: selecting an entry of the list of upcoming programs by matching entries of the list of upcoming programs against one or more program schedule values; inviting the user 8 to confirm the selected entry, e.g., by displaying an invitation on the screen 14; and scheduling the upcoming program associated with the selected entry in response to the user 8 confirming the selected entry. Scheduling of the upcoming program may comprise, e.g., one or more of the following: configuring the electronic program guide unit 20 to remind the user of the scheduled upcoming program; configuring the electronic program guide unit 20 to prompt the tuner 18 to tune to the scheduled upcoming program at the date and time of the scheduled upcoming program; and configuring the electronic program guide unit 20 to prompt a recording device to record the scheduled upcoming program at the date and time of the scheduled upcoming program; and configuring the electronic program guide unit 20 to ask the user for a key to enable the user to watch the scheduled upcoming program, e.g., for child protection. Triggering other actions in dependence of the program schedule information may also be envisioned. Scheduling the upcoming program may, for example, comprise reserving a time interval for the upcoming program.

The program schedule information may comprise a list of upcoming programs, and updating the program schedule information may comprise: matching entries of the list of upcoming programs against said one or more program schedule values; in response to not finding a matching entry in the list of upcoming programs, generating a new entry and inviting the user 8 to confirm the new entry; in response to the user 8 confirming the new entry, adding the new entry to the list of upcoming programs. Thus a program not included in the list of upcoming programs may be newly added to the list on the basis of the program schedule information extracted from the one or more recent frames in response to the scheduling request, assuming that the scheduling request is generated during or shortly after a program announcement.

Figure 3:
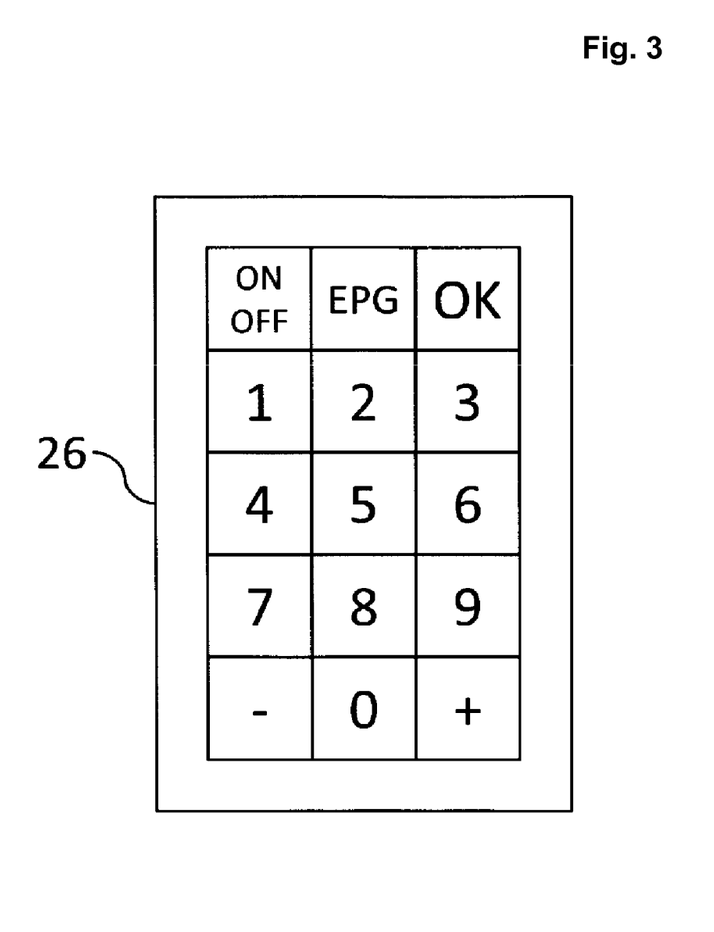
FIG. 3 schematically shows an example of an embodiment of a remote control.

The television set 10 may comprise the television receiver 12 and a user interface 16 for enabling the user 8 to trigger the scheduling request. The user interface 16 may notably be a remote control 26, or it may comprise a remote control 26. The user interface 16 may comprise a dedicated button for enabling the user 8 to trigger the scheduling request. The user 8 may thus be enabled to trigger the scheduling request rapidly and with little effort as soon as he/she becomes aware of the program announcement on the selected television channel, e.g., as soon as he/she hears that a program is announced or sees that a program title is displayed on the screen 14 along with, e.g., a scheduled date and time.

The method for updating program schedule information in a television receiver may comprise: operating a television signal input to receive a television signal; operating a tuner 18 to generate frames of a selected television channel consecutively on the basis of the television signal; operating a screen 14 to display the frames consecutively; operating a frame buffer 22 to buffer the frames consecutively; operating a control input to receive a scheduling request; operating a pattern recognition unit 24 to determine one or more program schedule values in response to the scheduling request by performing an automatic pattern recognition analysis of one or more frames residing in the frame buffer; and operating an electronic program guide unit 20 to provide program schedule information, wherein the electronic program guide unit 20 is arranged to update the program schedule information on the basis of said program schedule values. The frame buffer 22 may thus be operated to provide one or more recent frames of the selected television channel, and to update its content repeatedly, e.g., with each new frame, e.g., in a first-in first-out scheme. The user 8 may trigger the scheduling request in response to noticing a program announcement on the selected television channel. In this case, the one or more recent frames residing in the frame buffer 22 may comprise program information in a graphical format, and this program information may be extracted from the one or more frames by the pattern recognition analysis. The pattern recognition analysis may comprise extracting text information, e.g., using optical character recognition (OCR), as well as interpreting graphical content such station emblems.

These and other aspects are described in greater detail below.

FIG. 1 schematically shows an example of a television set 10. The television set 10 may be arranged to enable a user 8 to watch a television program. More specifically, the TV set 10 may be arranged to receive a TV signal, e.g., from an antenna or from a cable network, to select a certain television channel included in the TV signal, and to generate a moving image conveyed by the selected channel. The moving output image, i.e., video, may be accompanied by a corresponding audio output signal, e.g., including speech, music, or other types of sound. The TV signal may comprise one or more than one channel. The TV channels may be encoded in the TV signal in the form of analog or digital wave forms. In one example, each channel has a carrier wave that is modulated by an analog or digital signal representing program content of the channel. In another example, the channels share a common broadband spectrum using a spread spectrum technique.

In the example, the TV set 10 comprises a receiver 12, a screen 14, and a user interface 16. The user interface 16 may comprise a remote control. The remote control may be arranged to enable the user 8 to control the receiver 12, or both the receiver 12 and the screen 14, from a distance, e.g., over a few meters. For example, the remote control may be arranged to communicate with the receiver 12 using infrared signals. Alternatively or in addition, the user interface 16 may be connected to the receiver 12 by one or more wired connections, or be integrated in the receiver 12. In the shown example, the user interface 16 comprises a remote control. The screen 14 may be connected to the receiver 12 via one or more wired or wireless connections. The screen 14 may comprise a liquid crystal display (LCD), a cathode ray tube (CRT), a plasma screen, or any other kind of device for displaying a two-dimensional image in real-time dependence of a video signal representing the moving image.

The receiver 12 may comprise a tuner 18 for demodulating the TV signal to generate a video signal and an associated audio signal. The video signal and the audio signal may represent program content of a selected channel. The video signal may be fed to the screen 14, thereby driving the screen 14 to produce a corresponding output image that can be viewed by the user 8. The audio signal (not shown) may be fed to an audio output device, e.g., a loudspeaker (not shown), to produce sound that can be heard by the user 8.

Using the user interface 16, the user 8 may perform various control actions affecting the behavior of the receiver 12 and the screen 14. For example, the user interface 16 may be arranged to enable the user 8 to select a TV channel among the channels contained in the TV signal so that the program content of the selected channel will be displayed by the screen 14. In other words, the user 8 may use the user interface 16 to select a television channel that he/she wants to watch. The user interface 16 may also be arranged to enable the user 8 to perform tuning operations, such as adjusting a brightness or a contrast of the screen 14, or adjusting loudness of the audio output device. The user interface unit 16 may also comprise, for example, an on/off button for enabling the user 8 to switch the receiver 12, or both the receiver 12 and the screen 14, on and off.

The receiver 12 may further comprise an electronic program guide unit 20. The electronic program guide unit 20 may be arranged to memorize program schedule information. The program schedule information may comprise, for example, a list of upcoming programs. Each entry of the list may, for example, comprise one or more of the following: a title, a description, a date, a starting time, and a duration of the respective program, and also a channel identifier identifying a television channel on which the program is scheduled to be shown. The user interface 16 may be arranged to enable the user 8 to interact with the electronic program guide unit 20 so as to display the program schedule information or selected parts thereof, or to update program schedule information memorized by the electronic program guide unit 20. For example, the electronic program guide unit 20 may be connected or connectable to the screen 40 and arranged to display program schedule information on the screen 14 in response to an appropriate request received via, e.g., the user interface 16. For instance, the user interface unit 16 may be arranged to enable the user 8 to operate the receiver 12 and the screen 14 such that the screen 14 will display an image produced by the electronic program guide unit 20 instead of a television image produced by the tuner 18. The image produced by the electronic program guide unit 20 may, for example, include graphical lists and menus for enabling the user 8 to view the program schedule information on the screen 14, e.g., by browsing through virtual pages or by filtering the program schedule information according to user-defined criteria. The program schedule information may be obtained from the television signal received by the receiver 12 and may be repeatedly updated, e.g., continuously or periodically. The electronic program guide unit 20 may be arranged to store the program schedule information locally, that is, within the receiver 12 and update the stored program schedule information at appropriate times, e.g., periodically, or in response to detecting that the TV signal contains new program schedule information.

The electronic program guide unit 20 may also be operable by the user 8 to mark selected programs among the programs indicated by the program schedule information. The user 8 may thus use the electronic program guide 20 to remind the user of upcoming programs he/she wants to watch, or to control a recording device (not shown) to record the program received by the tuner 18 so that the program can be watched at a later time.

Television programs often include program announcements, i.e., TV promotions, to announce upcoming programs of the same channel or on other channels. For example, at the end of a program that is part of a series, the broadcaster often announces the date and time of the next program of the series. A program announcement may include, for example, a title, a date, and a starting time of the upcoming program. The program announcement can be made orally by a program announcer and is in many cases supplemented by corresponding visual information in the television image displayed on the screen 14. Alternatively, a program may be announced by visual information on the screen 14 without a corresponding oral notice. Also, an upcoming program may be announced on the screen using gesture language. In the shown example, a graphical program announcement 22 is displayed for a few seconds on the screen 14. In this example, the graphical program announcement comprises a title, a date, and a starting time, e.g., "Planet Earth—tomorrow—5 p.m.". The user 8 may gather the program announcement and may want to mark the upcoming program, e.g., "Planet Earth" in the electronic program guide 20, e.g., in order to remind him/her of the upcoming program or to trigger an automatic action by the TV set so that the receiver 12 will turn automatically to the channel of the upcoming program at the scheduled time, or for some other purpose. If the upcoming program is already included in the program schedule information provided by the electronic program guide unit 20, the user 8 may only need to select a corresponding entry provided by the electronic program guide unit 20 and mark the selected entry. If the upcoming program is not yet included in the program schedule information provided by the electronic program guide unit 20, the user 8 may add information from the program announcement to the program schedule information or modify the program schedule information, e.g., by overwriting an existing entry. As will be described in greater detail below, the receiver 12 may be provided with means for enabling the user 8 to configure the electronic program guide unit 20 with a reduced effort when the user 8 becomes aware of a program announcement.

The receiver 12 may comprise a frame buffer 22 connected to the tuner 18 and arranged to buffer frames of the current channel. The current channel is the selected channel, that is, the channel to which the tuner 18 is tuned to produce a television image on the screen 14 and, possibly, to produce a corresponding acoustic output signal. In one example, the frame buffer 22 is arranged to buffer, i.e., to memorize, only one frame at a time, e.g., the most recent frame provided by the tuner 18. The frame buffer 22 may in this case be relatively small and inexpensive as it may need to be able to buffer only a single frame at a time. In another example, the frame buffer 22 may be a first-in-first-out (FIFO) buffer that is capable of buffering two or more frames at a time. For example, the frame buffer 22 may be arranged to provide a certain number, e.g., two, three or more recent frames of the current channel. A recent frame is a frame that occurred within a recent period. The recent period may be a shifting time interval [T0, T1], wherein T1 is "now", i.e., the current point in time, and T0 is a preceding time. The shifting time interval may, for example, have a fixed length of, e.g., between 0.1 seconds and 5 seconds.

The receiver 12 may further comprise a pattern recognition unit 24 connected between the frame buffer and the electronic program guide unit 20. The pattern recognition unit 24 may be arranged to analyze the one or more recent frames provided by the frame buffer 22 in response to a scheduling request from the user 8. More specifically, the pattern recognition unit 24 may be arranged to determine one or more program schedule values, e.g., in response to the scheduling request, on the basis of the one or more recent frames, using pattern recognition analysis. For example, the pattern recognition unit 24 may be arranged to identify program announcements contained in the frames. The pattern recognition unit 24 may for instance be arranged to extract program information such as a title and a scheduled transmission time of an upcoming program from the one or more recent frames. The pattern recognition analysis employed for this purpose may notably include optical character recognition (OCR). The pattern recognition unit 24 may thus be arranged to generate a character representation of program information on the basis of a purely graphical representation of the program information. For instance, assuming that the one or more recent frames in the frame buffer 22 contain the text "Planet Earth—Monday—5 p.m." in the form of image data, e.g., in the form of an array of pixel values, the pattern recognition unit 24 may extract the text, i.e., a character sequence, "Planet Earth—Monday—5 p.m." from these frames. The pattern recognition unit 24 may be further arranged to analyse the extracted text to determine values of one or more program schedule variables. The program schedule variables may for instance include the following variables: a program title, a program date, a program time, and a program channel. In the example, the pattern recognition unit 24 may set the program title, the program date, the program time, and the program channel to the values "Planet Earth", "Monday", "5 p.m.", and to the current channel, respectively. The pattern recognition unit 24 may further translate these values into other values that may be more suitable for further processing or analysis. For instance, the pattern recognition unit 24 may be arranged to translate a date indicated as a day of the week, i.e., Monday, Tuesday, Wednesday, Thursday, Friday, Saturday, and Sunday, into a corresponding calendar date. The calendar date may consist, for example, of a year, a month, and a day of the month.

The pattern recognition unit may further be arranged to generate an electronic program guide update signal for updating the program schedule information provided by the electronic program guide unit 20. For instance, the pattern recognition unit 24 may be arranged to prompt the EPG unit 20 to find an entry in the program schedule information which matches or which has features in common with the program schedule values determined by the pattern recognition unit 24, and to mark the respective entry, e.g., by setting a certain flag associated with the respective entry of the program schedule information. The pattern recognition unit 24 or the electronic program guide unit 20 may be arranged to ask the user 8 for a confirmation before marking the entry. For instance, the user 8 may be asked, e.g., via the screen 14, to confirm the selected entry and the user 8 may be enabled to confirm or to reject marking of the selected entry by means of the user interface 16. Furthermore, if the program schedule information provided by the EPG unit 20 does not contain an entry that matches with the program schedule values determined by the pattern recognition unit 24, the EPG unit 20 may create a new entry. Thus, in a first scenario, the pattern recognition unit 24 in cooperation with the EPG unit 20 enables the user 8 to select an existing entry of the program schedule information provided by the EPG unit 20 in a convenient manner, namely, in response to the scheduling request from the user 8 and without requiring the user 8 to browse through the program schedule information or to enter the program schedule values manually. In a second scenario, the announced program is not yet present in the program schedule information and in this case a new entry corresponding to the program announcement as analysed by the pattern recognition unit 24 may be added to the program schedule information in the EPG unit 20.

In the example of FIG. 1, the frame buffer 22 is connected to the screen 14 so as to receive new frames from the tuner 18 via the screen 14. In the example of FIG. 2 in contrast, the frame buffer 22 is connected to the tuner 18 to receive new frames more directly, e.g., not via the screen 14.

In the example of FIG. 3, the user interface 16 comprises a remote control 26. The remote control 26 may comprise various control elements such as buttons or pads for enabling the user 8 to generate various control signals for controlling the receiver 12 and the screen 14. For example, the remote control 26 may comprise an on/off-button for setting the receiver 12 and the screen 14 into a normal operating mode and into a sleep mode, respectively. The remote control unit 26 may further comprise a plus button and a minus button for adjusting the loudness of loudspeakers of the set 10 or for various browsing operations, e.g., for browsing the electronic program guide. The remote control 26 may further comprise an EPG button. The EPG button may enable the user 8 to generate a scheduling request by pressing the EPG button. In one example, pressing the EPG button generates the scheduling request, prompting the pattern recognition unit 24 to determine the one or more program schedule values on the basis on one or more recent frames in the frame buffer 22, and to select a corresponding entry in the EPG unit 20, and to ask the user 8 for a confirmation of the thus determined entry. The remote control 26 may further comprise an OK button for enabling the user 8 to confirm the entry. When the user 8 presses the EPG button but the frames and the frame buffer unit 22 do not contain a program announcement and the pattern recognition unit 24 therefore fails to determine any meaningful program schedule values, the electronic program guide unit 20 may display program schedule information to the user 8, e.g., in a manner known from the prior art. More generally, the user interface 16 may comprise a dedicated control element or enabling the user 8 to generate the scheduling request by a single brief control action, such as pressing a certain button or touching a certain touchpad area. The user 8 may thus be enabled to generate the scheduling request easily as soon as he/she notes a program announcement, e.g., when he/she sees the program announcement on the screen 14 or when he/she hears the program announcement via the speakers of the television system 10.

Figure 4:
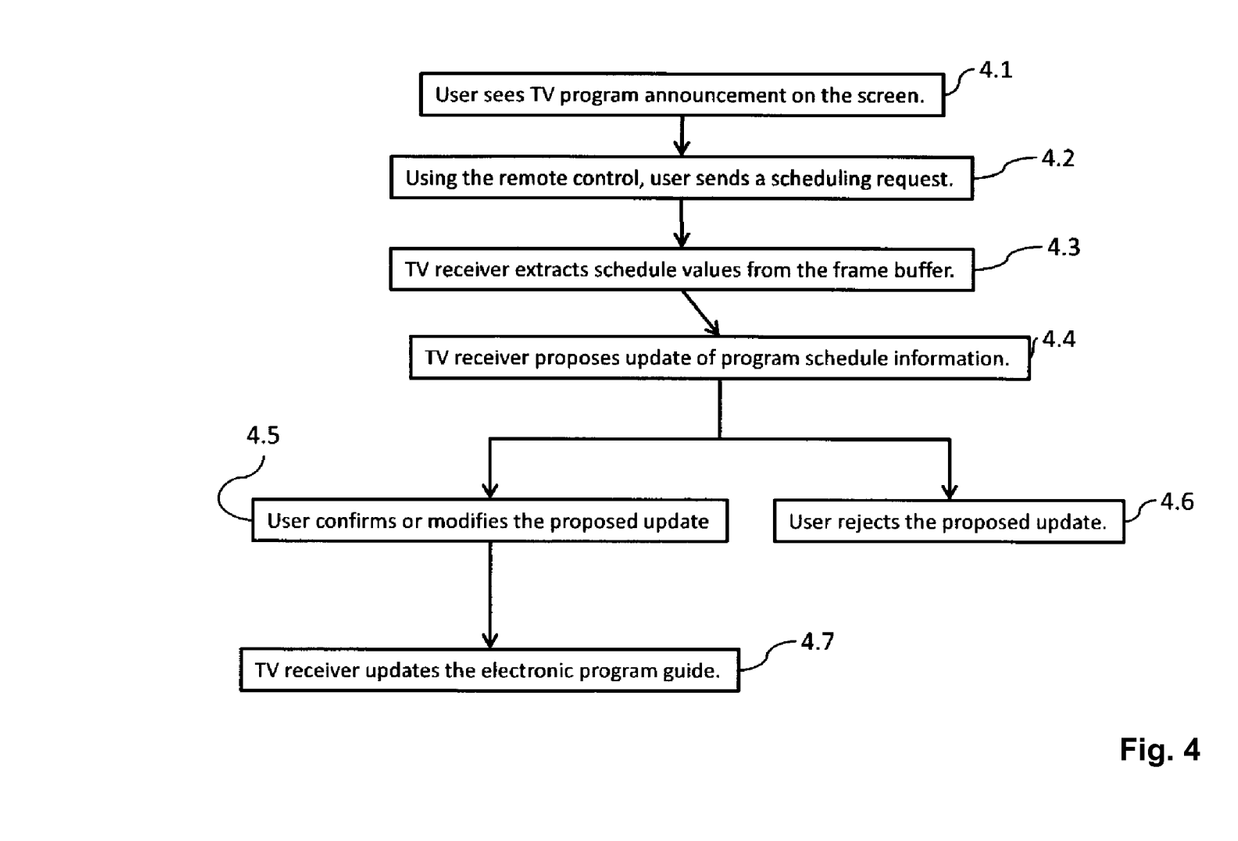
FIG. 4 shoes a flow chart of an example of an embodiment of a method of operating a TV set.

Referring now to FIG. 4, an example of a method of operating a television set 10 is described. In the example, a user watching a television program becomes aware of a program announcement on the channel he/she is watching. For instance, the user may see the program announcement on the screen or hear the program announcement via the loudspeakers (box 4.1). Using a user interface, e.g., a remote control, the user may then generate a scheduling request (box 4.2). The receiver of the TV set, in response to the scheduling request, may then extract program schedule values from the frame buffer of the TV set (box 4.3). The receiver may then select or generate a program schedule information entry in the electronic program guide unit in dependence of the program schedule values. The receiver may further propose to the user to mark the respective entry, e.g., for tuning the tuner automatically to the appropriate channel at the scheduled time of the announced program, or for generating a visual or acoustic alert shortly before or at the scheduled time of the program (box 4.4). Or the receiver may propose updating the program schedule information in the EPG unit. The user may then confirm (box 4.5) or reject (box 4.6) the proposed marking or update of the program schedule information. If the user confirms or modifies the proposed marking or update, the receiver may mark or update the program schedule information provided by the electronic program guide unit accordingly (box 4.7).

In the foregoing specification, the invention has been described with reference to specific examples of embodiments of the invention. It will, however, be evident that various modifications and changes may be made therein without departing from the broader spirit and scope of the invention as set forth in the appended claims.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, the pattern recognition unit 24 may be integrated in the EPG unit 20.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments. For example, referring back to FIG. 4, the TV receiver may propose several updates of program schedule information in response to a single scheduling request. The operations described with reference to boxes 4.4 to 4.7 may thus be performed several times in response to the scheduling request.

Also for example, in one embodiment, the illustrated examples may be implemented as circuitry located on a single integrated circuit or within a same device. For example, the tuner 18, the frame buffer 22, the pattern recognition unit 24, and the EPG unit 20 may be located on a single integrated circuit. Alternatively, the examples may be implemented as any number of separate integrated circuits or separate devices interconnected with each other in a suitable manner. For example, the tuner 18 and the EPG unit 20 may be located on separate integrated circuits.

Also for example, the examples, or portions thereof, may be implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'. Notably, the pattern recognition unit 24 and the EPG unit 20 may be implemented partly or entirely in software. For example, the TV receiver may be a so-called smart TV and the pattern recognition unit 24 may be provided in the form of an application that is loaded onto the smart TV, e.g., using the internet.

The invention may also be implemented in a computer program for running on a computer system, at least including code portions for performing steps of a method according to the invention when run on a programmable apparatus, such as a computer system or enabling a computer system to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a tangible non-transitory computer readable storage medium or transmitted to the computer system via a computer readable transmission medium. All or some of the computer program may be provided on computer readable media permanently, removably or remotely coupled to a computer system. The tangible non-transitory computer readable media may include, for example and without limitation, any number of the following: magnetic storage media including disk and tape storage media; optical storage media such as compact disk media (e.g., CD-ROM, CD-R, etc.) and digital video disk storage media; non-volatile memory storage media including semiconductor-based memory units such as FLASH memory, EEPROM, EPROM, ROM; ferromagnetic digital memories; MRAM; volatile storage media including registers, buffers or caches, main memory, RAM, just to name a few.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A television receiver, comprising:
a television signal input for receiving a television signal;
a tuner arranged to generate consecutive frames of a selected television channel on the basis of the television signal and connected or connectable to a screen so as to drive the screen to display the frames consecutively;
a frame buffer arranged to buffer said frames;
a control input arranged to receive a scheduling request triggered by a user;
a pattern recognition unit arranged to determine one or more program schedule values identifying a upcoming program, in response to the scheduling request, by performing an automatic pattern recognition analysis of an array of pixel values of one or more recent frames of said frames residing in the frame buffer to extract textual information wherein the one or more recent frames are within a predetermined time of the received scheduling request, wherein the pattern recognition unit is arranged to set a channel value to a selected television channel if said pattern recognition analysis does not produce a channel value; and
an electronic program guide unit for providing program schedule information, wherein the electronic program guide unit is arranged to update the program schedule information on the basis of said program schedule values.

2. The television receiver of claim 1, wherein the frame buffer has a capacity of one frame.

3. The television receiver of claim 1, wherein the frame buffer has a capacity of two or more frames.

4. The television receiver of claim 1, wherein the one or more program schedule values include one or more of the following: a program title value representative of a program title, a date value representative of a data, a time value representative of a time, and a channel value representative of a television channel.

5. The television receiver of claim 1, wherein said program schedule information comprises a list of upcoming programs and said updating of the program schedule information comprises:
selecting an entry of said list of upcoming programs by matching entries of the list of upcoming programs against said one or more program schedule values;
inviting the user to confirm the selected entry; and
scheduling the upcoming program associated with the selected entry in response to the user confirming the selected entry.

6. The television receiver of claim 5, wherein said scheduling of the upcoming program comprises one or more of the following:
configuring the electronic program guide unit to remind the user of the scheduled upcoming program;
configuring the electronic program guide unit to prompt the tuner to tune to the scheduled upcoming program at the date and time of the scheduled upcoming program; and
configuring the electronic program guide unit to prompt a recording device to record the scheduled upcoming program at the date and time of the scheduled upcoming program; and
configuring the electronic program guide unit to ask the user for a key to enable the user to watch the scheduled upcoming program.

7. The television receiver of claim 6, wherein said scheduling of the upcoming program comprises reserving a time interval for the upcoming program.

8. The television receiver of claim 1, wherein said program schedule information comprises a list of upcoming programs and said updating of the program schedule information comprises:
matching entries of the list of upcoming programs against said one or more program schedule values;
in response to not finding a matching entry in the list of upcoming programs, generating a new entry and inviting the user to confirm the new entry;
in response to the user confirming the new entry, adding the new entry to the list of upcoming programs.

9. The television receiver of claim 1, wherein said pattern recognition analysis comprises optical character recognition.

10. A television set comprising the television receiver of claim 1 and a user interface for enabling the user to trigger the scheduling request.

11. The television set of claim 10, wherein the user interface is or comprises a remote control.

12. The television set of claim 10, wherein the user interface comprises a dedicated button for enabling the user to trigger the scheduling request.

13. The television set of claim 11, wherein the user interface comprises a dedicated button for enabling the user to trigger the scheduling request.

14. A method for updating program schedule information in a television receiver, comprising:
operating a television signal input to receive a television signal;
operating a tuner to generate frames of a selected television channel consecutively on the basis of the television signal;
operating a screen to display the frames consecutively;
operating a frame buffer to buffer the frames;
operating a control input to receive a scheduling request;
operating a pattern recognition unit to determine one or more program schedule values identifying a upcoming program, in response to the scheduling request, by performing an automatic pattern recognition analysis of an array of pixel values of one or more recent frames of said frames residing in the frame buffer to extract textual information wherein the one or more recent frames are within a predetermined time of the received scheduling request, wherein the pattern recognition unit is arranged to set a channel value to a selected television channel if said pattern recognition analysis does not produce a channel value; and
operating an electronic program guide unit to provide program schedule information, wherein the electronic program guide unit is arranged to update the program schedule information on the basis of said program schedule values.

15. The method of claim 14, comprising:
triggering said scheduling request in response to noticing a program announcement on the selected television channel.

16. A television receiver, comprising:
a television signal input for receiving a television signal;
a tuner arranged to generate consecutive frames of a selected television channel on the basis of the television signal and connected or connectable to a screen so as to drive the screen to display the frames consecutively;
a frame buffer arranged to buffer said frames;
a control input arranged to receive a scheduling request triggered by a user;
a pattern recognition unit arranged to determine one or more program schedule values in response to the scheduling request, by performing an automatic pattern recognition analysis of one or more frames residing in the frame buffer; and
an electronic program guide unit for providing program schedule information, wherein the electronic program guide unit is arranged to update the program schedule information on the basis of said program schedule values,
wherein the one or more program schedule values include one or more of the following:
a program title value representative of a program title, a data value representative of a data, a time value representative of a time, and a channel value representative of a television channel, and
wherein the pattern recognition unit is arranged to set the channel value to the selected television channel if said pattern recognition analysis does not produce a channel value.

17. The television receiver of claim 16, wherein the frame buffer has a capacity of one frame.

18. The television receiver of claim 16, wherein the frame buffer has a capacity of two or more frames.

19. The television received of claim 16, wherein said program schedule information comprises a list of upcoming programs and said updating of the program schedule information comprises:
selecting an entry of said list of upcoming programs by matching entries of the list of upcoming programs against said one or more program schedule values;
inviting the user to confirm the selected entry; and
scheduling the upcoming program associated with the selected entry in response to the user confirming the selected entry.

* * * * *